United States Patent [19]

Stremeckus

[11] 4,073,085
[45] Feb. 14, 1978

[54] FISH LURE BOX

[76] Inventor: Victor Robert Stremeckus, 5 S. Waverly St., Brighton, Mass. 02135

[21] Appl. No.: 673,191

[22] Filed: Apr. 2, 1976

[51] Int. Cl.² .............................................. A01K 97/06
[52] U.S. Cl. .................................................. 43/54.5 R
[58] Field of Search ............... 43/57.5 R, 57.5 A, 54.5

[56] References Cited
U.S. PATENT DOCUMENTS

| | | | |
|---|---|---|---|
| 2,634,541 | 4/1953 | Adams | 43/57.5 R |
| 2,724,208 | 11/1955 | Nelson | 43/57.5 R |
| 2,924,908 | 2/1960 | Lisowy | 43/57.5 R |
| 2,948,080 | 8/1960 | Hawley | 43/57.5 R |
| 3,377,736 | 4/1968 | Woolworth | 43/57.5 |
| 3,453,770 | 7/1969 | Schultz | 43/57.5 |
| 3,739,518 | 6/1973 | Ziegler | 43/57.5 |
| 3,881,273 | 5/1975 | Herring | 43/57.5 R |

Primary Examiner—Louis G. Mancene
Assistant Examiner—Peter K. Skiff
Attorney, Agent, or Firm—Joseph S. Iandiorio

[57] ABSTRACT

A fish lure box including a base having a compartment; a hook rack mounted to the compartment and having a multiplicity of holes for receiving fish hooks; a clamp assembly including a clamp arm extending in the same general direction and spaced from the hook rack; hinge means for swingably interconnecting the clamp arm and the compartment; a first resilient member attached to the compartment adjacent the clamp arm and a second resilient member attached to clamp arm juxtaposed to the first resilient member; and latching means for securing the clamp arm to the compartment with the resilient members in juxtaposition for gently, firmly holding fish lures extending from the hook rack.

6 Claims, 4 Drawing Figures

FISH LURE BOX

FIELD OF INVENTION

This invention relates to a fish lure box.

BACKGROUND OF INVENTION

Boxes for holding fishing tackle such as snelled hooks and lures often have a limited number of mounted positions for hooks or lures. Often, too, the space between the parts that hold opposite ends of the lures is set to accomodate a particular length lure. Certain fishing tackle boxes use cork or other puncturable material to receive the pointed ends of the hooks. Other types hold the middle of the lures or snelled hooks permitting the hooks and other ends of the lures and snells to hang free where they may become entangled. Such boxes suffer from a number of shortcomings: many of the boxes, when they are open and even when they are closed, expose all or much of the lures; the puncturable material may eventually break and crumble; during its useful life the puncturable material may absorb and hold moisture and cause premature rusting and corrosion of the tackle; the boxes do not easily accomodate a varied number of different size pieces of tackle; there is little or no ventilation to enable the tackle to dry; often the boxes employ rather complex structure but do not firmly but gently hold the lures.

SUMMARY OF INVENTION

It is therefore an object of this invention to provide an improved, simple, light-weight fish tackle box for firmly but gently holding an indefinite number of differing length fishing lures.

It is a further object of this invention to provide such a box which is protective of the lures yet well ventilated for easy drying of the lures.

The invention features a fish lure box including a base having a compartment. There is a hook rack mounted to the compartment having a multiplicity of holes for receiving fish hooks. There is also a clamp assembly in the compartment. The clamp assembly includes a clamp arm, which extends in the same general direction as the hook rack and is spaced from it, and hinge means for swingably interconnecting the clamp arm and the compartment. The clamp assembly further includes a first resilient member attached to the compartment adjacent the clamp arm and a second resilient member attached to the clamp arm juxtaposed to the first resilient member. Latching means secure the clamp arm to the compartment with the resilient members in juxtaposition for gently, firmly holding fish lures extending from the hook rack.

In preferred embodiments, the hinge means is disposed along the edge of the clamp arm transverse to the longitudinal axis of the hook rack, the hook rack includes a plurality of adjacent rows of holes, and the box further includes a cover and a hinge member interconnecting the base and the cover. Either or both the base and cover may include ventilator holes and the cover may include a second compartment similar to the compartment in the base and including at least one hook rack and clamp assembly.

DISCLOSURE OF PREFERRED EMBODIMENT

Other objects, features and advantages will occur from the following description of a preferred embodiment and the accompanying drawings, in which.

The invention may be accomplished using a fish lure box that includes a base having a compartment and a hook rack mounted to that compartment and having a multiplicity of holes for receiving fish hooks. The base may also include a clamp assembly having a clamp arm, extending in the same general direction and spaced from the hook rack. Hinge means interconnect the clamp arm and the compartment. There is a first resilient member attached to the compartment adjacent the clamp arm and a second resilient member attached to the clamp arm juxtaposed to the first resilient member. Latching means are provided for securing the clamp arm to the compartment with the resilient members in juxtaposition for gently, firmly holding fish lures extending from the hook rack.

Preferably, the hinge means is disposed along one edge of the clamp arm, transverse to the longitudinal axis of the hook rack, but this is not a necessary limitation. For example, the hinge may be located along the lower edge of the clamp assembly on the opposite side from the hook rack. This alternative limits the length of the fish lures that can be held: they cannot extend to a distance greater than that between the hook rack and the hinge along the lower longitudinal edge of the clamp arm.

The hook rack typically includes a plurality of adjacent rows of holes to receive the hooks, and in a preferred embodiment the rows are arranged so that the holes in one row are staggered with respect to the holes in an adjacent row.

The box may include a cover and a hinge interconnecting the cover and the base. The cover may include a second shallow compartment similar to the base compartment, and the cover compartment may include at least one hook rack having a multiplicity of holes for receiving fish hooks, and a clamp assembly, all similar to their counterparts in the base compartment.

Either or both the base and cover may be provided with ventilator holes on either or both sides of the hook rack, that is in the portion of the compartment between the hook rack and the clamp assembly or on the other side of the hook rack, as well as in the bottom and top edges of the base and cover.

Figure 1:
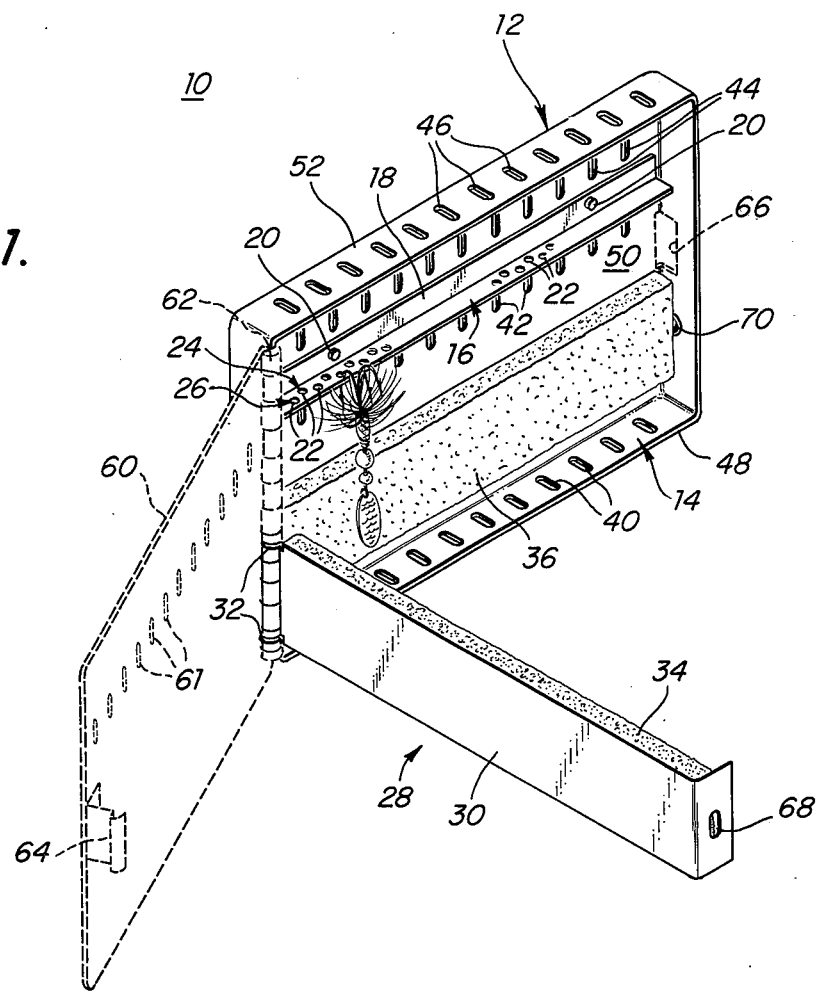
FIG. 1 is an axonometric view of a fish lure box according to this invention.

There is shown in FIG. 1 box 10 including base 12, having compartment 14, in which is located hook rack 16 formed of an angle bracket 18 fastened to the back of compartment 14 by means of rivets 20. Hook rack 16 includes a multiplicity of holes 22 arranged in two rows 24, 26, which are arranged so that the holes in adjacent rows are staggered with respect to each other.

Compartment 14 also includes a clamp assembly 28 including clamp arm 30 interconnected with compartment 14 by means of hinge 32. Clamp assembly 28 also includes a resilient pad 36 attached to the inside of compartment 14 in juxtaposition to pad 34. Pads 34 and 36 may be made of a material such as foam rubber. Ventilation holes 40, 42, 44, and 46 may be located in a lower edge 48 in back portion 50, or in the top edge 52 of compartment 14.

Figure 2:
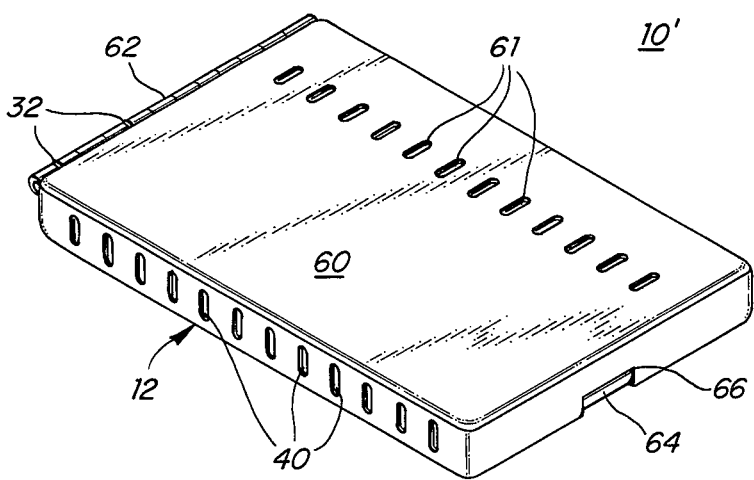
FIG. 2 is an axonometric view of a fish lure box similar to that shown in FIG. 1 with a cover attached in the closed position.

Box 10 may have a cover 60 with ventilator holes 61 attached to base 12 by means of hinge 62 and may carry a spring member 64 which engages with aperture 66 in base 12 to form a latching means to secure cover 60 in place when it is closed. Similarly, clamp arm 30 may contain a hole 68 which receives ball 70 to latch clamp arm 39 when it is in the closed position. With cover 60 attached and in the closed position, open fish lure box 10 appears as fish lure box 10", FIG. 2.

Figure 3:
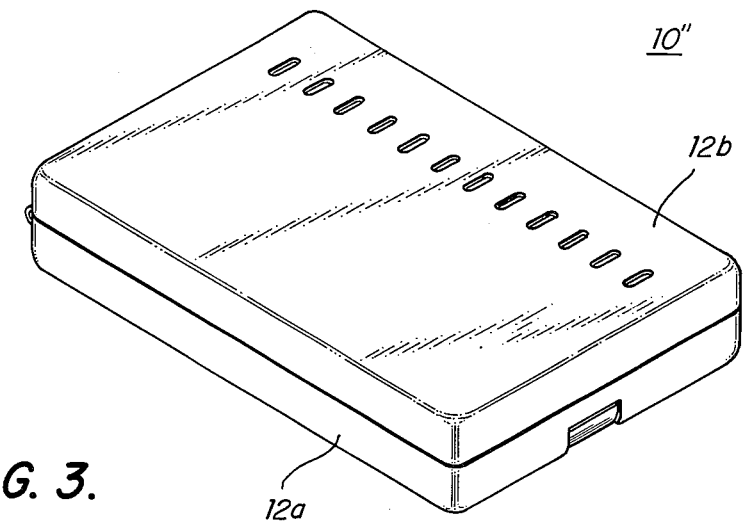
FIG. 3 is an axonometric view of a fish lure box similar to that shown in FIGS. 1 and 2, in which the cover as well as the base includes a compartment for holding fish lures.
Figure 4:
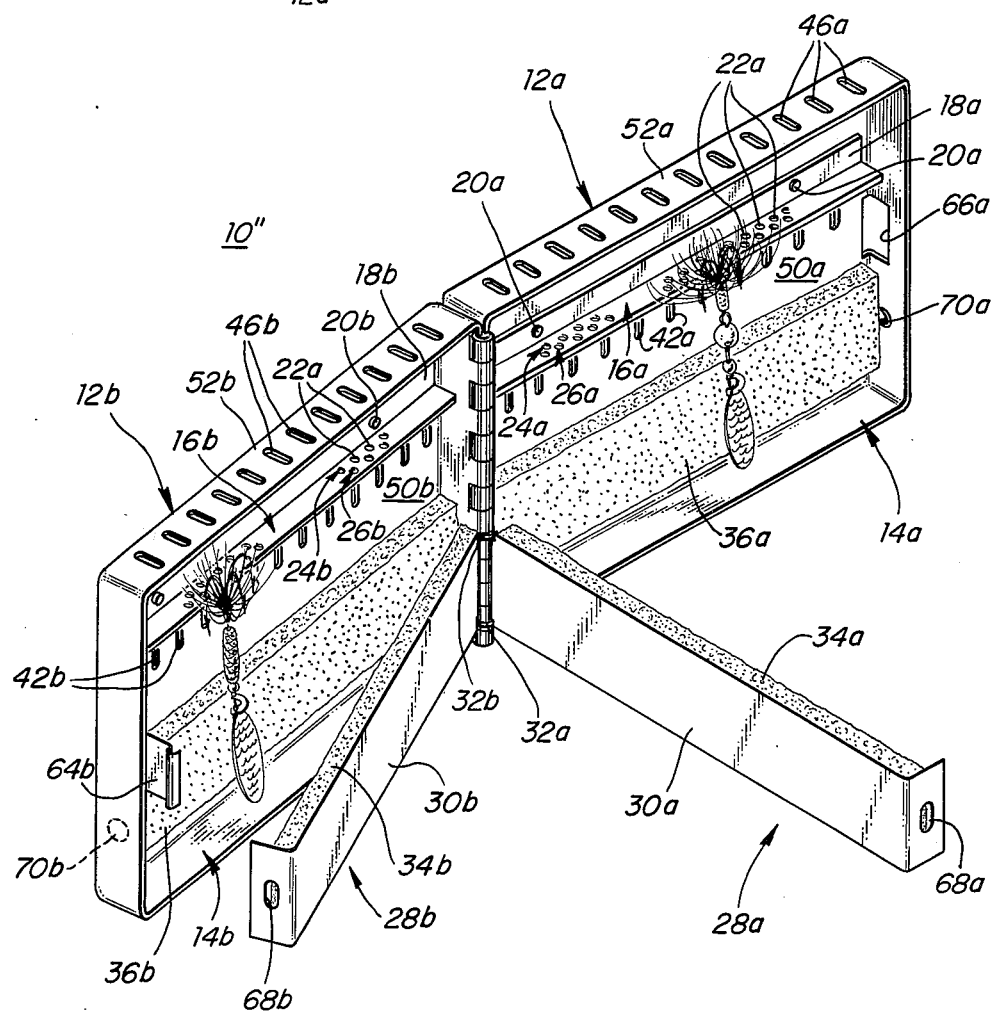
FIG. 4 is an axonometric view of the fish lure box of FIG. 3 in a partially open position.

Alternatively, as shown in FIGS. 3 and 4, where like parts have been given like numbers accompanied by lower case letters *a* and *b*, fish lure box 10" may include base 12*a* and cover 12*b*, each of which contain compartments 14*a* and 14*b*, respectively. Compartments 14*a*, FIG. 4, includes hook rack 16*a* having holes 22*a* disposed in two rows 24*a*, 26*a*, contained in bracket 18*a*, fastened to compartment 14*a* by rivets 20*a*. Clamp assembly 28*a* includes clamp arm 30*a*, hinged at 32*a* and containing resilient pad 34*a* which mates with resilient pad 36*a* fixed to compartment 14*a*. Ventilator holes 42*a* are provided in the back wall 50*a* of compartment 14*a* and ventilator holes 46*a* are provided in the top edge 52*a* of compartment 14*a*. Ball 70*a* engages with holes 68*a* in the end of clamp arm 30*a*. Aperture 66*a* in base 12*a* receives spring member 64*b* attached to cover 12*b*, which includes compartment 14*b* having a hook rack, clamp assembly and ventilator holes similar to compartment 14*a*, with the exception that hook rack 16*b* is spaced farther away from clamp assembly 28*b* than hook rack 16*a* is spaced from clamp assembly 28*a*.

Other embodiments will occur to those skilled in the art and are within the following claims:

What is claimed is:

1. A fish lure box comprising: a base including a compartment; an elongate hook rack mounted to said compartment and having a multiplicity of holes for receiving fish hooks; a cover for said compartment; first latch means for releasably securing said cover to said compartment; a clamp assembly intermediate said cover and said compartment and including an elongate clamp arm laterally spaced from said rack; first hinge means for swingably interconnecting said cover and said compartment; said hinge means for swingably interconnecting said clamp arm with said compartment between said compartment and said cover; said first and second hinge means being disposed along an edge of said compartment transverse to the longitudinal axis of said elongate hook rack; a first narrow, elongate resilient member attached to said compartment adjacent said clamp arm, and a second narrow elongate resilient member attached to said clamp arm in juxtaposition to said first resilient member; second latch means for securing said clamp arm to said compartment with said resilient members in close juxtaposition for gently, firmly holding a portion of the bodies of fish lures whose hooks engage said hook rack.

2. The fish lure box of claim 1 in which said hook rack includes a plurality of adjacent rows of holes.

3. The fish lure box of claim 1 in which said base includes a plurality of ventilator apertures.

4. The fish lure box of claim 3 in which there are a number of ventilator apertures disposed in said base in a row between said hook rack and clamp assembly.

5. The fish lure box of claim 3 in which there are a number of ventilator apertures disposed in said base in a row on the other side of said hook rack from said clamp assembly.

6. A fish lure box comprising a base including a first compartment; a cover including a second compartment; first hinge means interconnecting said base and cover; a first latch means for releasably securing said base and cover; each compartment including: an elongate hook rack mounted to said compartment and having a multiplicity of holes for receiving fish hooks; a clamp assembly including an elongate clamp arm laterally spaced from said rack; second hinge means for swingably interconnecting said clamp arm with said compartment; said first and second hinge means being disposed along an edge of said compartment transverse to the longitudinal axis of said elongate hook rack; a first narrow, elongate resilient member attached to said compartment adjacent said clamp arm, and a second narrow elongate resilient member attached to said clamp arm in juxtaposition to said first resilient member; second latch means for securing said clamp arm to said compartment with said resilient members in close juxtaposition for gently, firmly holding a portion of the bodies of fish lures whose hooks engage said hook rack.

* * * * *